United States Patent [19]

Fennel et al.

[11] Patent Number: 4,688,858
[45] Date of Patent: Aug. 25, 1987

[54] SLIP-CONTROLLED BRAKE SYSTEM FOR MOTOR VEHICLES

[75] Inventors: Helmut Fennel, Bad Soden; Ivica Batistic, Frankfurt am Main; Otto Determann, Darmstadt, all of Fed. Rep. of Germany

[73] Assignee: Alfred Teves GmbH, Frankfurt am Main, Fed. Rep. of Germany

[21] Appl. No.: 755,932

[22] Filed: Jul. 16, 1985

[30] Foreign Application Priority Data

Jul. 18, 1984 [DE] Fed. Rep. of Germany ....... 3426455

[51] Int. Cl.⁴ .............................................. B60T 8/44
[52] U.S. Cl. .................................. 303/6 R; 188/358; 303/114; 303/119
[58] Field of Search ............. 303/119, 6 R, 6 A, 114, 303/113, 96, 98, 117, 116, DIG. 3, 111, 6 C; 60/545, 547.1; 188/181, 345, 355–360, 349

[56] References Cited

U.S. PATENT DOCUMENTS

| 3,948,568 | 4/1976 | Leiber | 303/119 X |
| 4,057,301 | 11/1977 | Foster | 303/114 |
| 4,395,072 | 7/1983 | Belart | 303/114 |
| 4,418,966 | 12/1983 | Hattwig | 303/119 X |
| 4,460,220 | 7/1984 | Petersen | 303/119 |
| 4,477,125 | 10/1984 | Belart et al. | 303/119 X |
| 4,492,413 | 1/1985 | Belart et al. | 303/119 X |
| 4,547,022 | 10/1985 | Brearley et al. | 303/111 X |

FOREIGN PATENT DOCUMENTS

| 2926227 | 1/1981 | Fed. Rep. of Germany | 303/119 |
| 3109372 | 9/1982 | Fed. Rep. of Germany | . |
| 3320822 | 12/1984 | Fed. Rep. of Germany | . |
| 2492752 | 4/1982 | France | . |
| 2543898 | 10/1984 | France | . |

Primary Examiner—Douglas C. Butler
Attorney, Agent, or Firm—James B. Raden; William J. Michals

[57] ABSTRACT

A slip-controlled brake system comprises two hydraulically separated pressure medium circuits, to which the wheel brakes (14, 15 and 16, 17, respectively) of the wheels arranged diagonally at the vehicle are connected. In one diagonal (brake circuit 9) the braking pressure during slip control is controlled in phase, whereas in the second diagonal (brake circuit 10) individual brake slip control is possible by way of two individual inlet and outlet valve pairs (11, 18; 12, 19).

6 Claims, 2 Drawing Figures

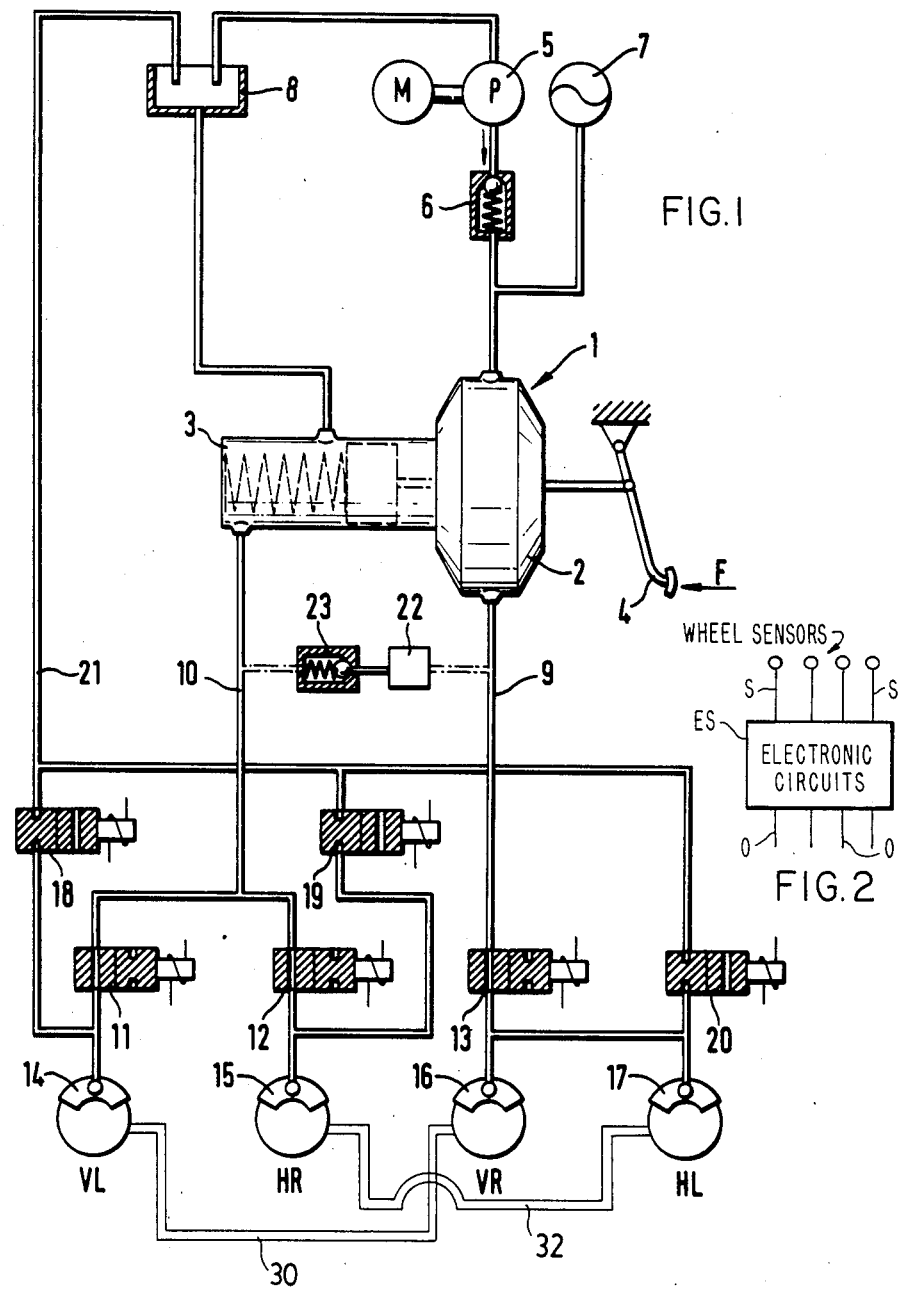

SLIP-CONTROLLED BRAKE SYSTEM FOR MOTOR VEHICLES

BACKGROUND OF THE INVENTION

The present invention relates to a slip-controlled brake system for motor vehicles which comprises a braking pressure generator fed from an auxiliary energy source, to which generator the wheel brakes of each front wheel and the respective diagonally opposite rear wheel are connected by way of two hydraulically separated pressure medium circuits. Inlet valves are inserted into the circuits which normally in their initial position are switched to open passage. Return flow conduits are provided which connect the wheel brakes with the pressure compensation reservoir and into which outlet valves are inserted which are closed in their initial position. The brake system further comprises wheel sensors for determination of the rotational behavior of the wheels and electric circuits for processing the sensor signals and generating braking pressure control signals which can be transmitted to the inlet and outlet valves.

The locking of the vehicle wheels during a braking operation can be prevented in brake systems operated hydraulically or by compressed air by means of so-called inlet and outlet valves which are inserted into the pressure medium path towards the wheel brakes and/or into a return flow conduit or into a pressure relief path and by which, as soon as the delay and/or wheel slip condition exceeds a certain value, a further braking pressure increase can be prevented or the braking pressure reduced. Systems of this type are known in numerous variations.

Optimal braking behavior, (i.e. high driving or directional stability while achieving a short stopping distance) is to be expected at each vehicle wheel when the braking pressure is controlled individually. However, since the number of components required, including control and regulating circuits, monitoring and safety circuits, etc., is very large and a convenient restriction to two or three regulating channels in connection with certain selection criteria, such as select-low, select-high, and with balanced control of the braking pressure in several wheel brakes will lead to relatively low losses, it is expedient to avoid individual control of all wheels.

Therefore, double-circuit hydraulic brake systems of the type described have been developed and described, by which upon recognition of a locking hazard the braking pressure can be varied in phase (i.e. concurrently for both associated wheels) by means of a common pair of inlet and outlet valves. If in this process the pressure in each regulating channel is determined according to the select-low principle by the wheel with the worst road contact, a longer stopping distance must be tolerated.

A further known measure is to insert in such brake systems an additional two-way/two-position directional control valve in the pressure medium path towards the wheel brake at the rear wheel. Accordingly, when the rear wheel is relieved as a result of the dynamic shift of the weight on the axle upon switching over of this valve a locking of the relieved rear wheel is prevented and at the same time a further braking pressure increase is provided at the front wheel (DE disclosure document No. 31 36 616). In situations where the use of the braking effect of the rear wheels is essential, in particular in case of low adherence value, this known measure offers no improvement.

It has also been proposed to normally derive the control input for determination of the braking pressure in the diagonal from the front wheel, but to effect a switching-over in certain situations according to predetermined criteria so that the rear wheel instead of the front will temporarily determine the braking pressure (DE-P No. 33 14 802.3). In other situations, joint control of the braking pressure of both wheels connected to a pressure medium circuit as compared to systems with three or four control channels is nevertheless disadvantageous.

It is also known to apply the selection criteria "select-low/select-high" determining control of the pressure in both circuits temporarily to specific configurations (EP No. 51 801), in order to reduce the number of control channels in a diagonally arranged double-circuit brake system and to provide a single pressure modulator per pressure medium circuit and, for better adaptation of the braking pressure regulation to the respective situation. Here, a locking of the wheel bearing the lead load is accepted in favor of a short stopping distance.

The object of the present invention is to overcome the disadvantages described above, to improve the controllability of a brake system of the initially mentioned type with at most minor additional expense, and in particular to increase substantially the braking effect at a low coefficient of friction without adversely influencing the braking effect at a high coefficient of friction.

SUMMARY OF THE INVENTION

This object is achieved in a surprisingly simple manner by an improvement of a brake system wherein the wheel brakes of the two associated wheels in the one diagonal are connected by way of an inlet valve and outlet valve each and, in the second diagonal, by way of a common inlet valve and a common outlet valve to the braking pressure generator or a brake circuit and to the pressure compensation reservoir respectively.

Which diagonal is chosen for connection to the common pressure medium circuit and to the pressure compensation reservoir by way of individual inlet and outlet valves depends on the vehicle construction, the brake arrangement, and so forth. The inlet and outlet valves can be designed as electromagnetically actuatable multi-directional control valves, in particular as two-way/two-position or four-way/three-position directional control valves.

By dividing one of the two brake circuits in accordance with the present invention, a two-channel system can be expanded, in a way, into a three-channel system. As compared to brake systems with no more than independent control of the braking pressure in the two diagonals, the measures proposed by the invention improve the steerability and brakability of the vehicle at a low coefficient of friction, because in such situations a comparatively high pressure can be supplied to the rear wheel in the diagonal with individual control of the wheels, while at the same time the pressure at the front wheel can be limited to a level sufficiently low with regard to lateral guidance and steerability. If at the same time the braking pressure in the second diagonal is determined according to the select-low principle, it is ensured that optimum braking power is applied to three wheels, while the braking of one wheel in an unfavorable case remains slightly below optimum.

BRIEF DESCRIPTION OF THE DRAWINGS

Further characteristics, advantages, and possible applications of the invention can be taken from the following description and the accompanying drawing in which FIG. 1 provides a diagrammatic illustration of the hydraulic circuits of a brake system in accordance with the present invention and FIG. 2 is a diagram of the arrangement of the wheel sensors and electronic circuits utilized in practicing the present invention.

DETAILED DESCRIPTION

The brake system shown in FIG. 1 of the drawing consists essentially of a two-circuit hydraulic braking pressure generator 1, which in turn is composed of a hydraulic brake force booster 2 and a single-type master cylinder 3. The brake force booster 2 is actuated by means of the brake pedal 4; the pedal force is symbolized by the letter F. For provision of the system with auxiliary energy, a hydraulic pump 5 with the associated check valve 6 and a hydraulic accumulator 7 are provided. The pump 5 in this case is driven electrically by means of the motor M.

The suction side of the pump 5 is connected to a pressure compensation and supply reservoir 8 which is also in communication with the master cylinder. The two brake circuits 9, 10 of the braking pressure generator 1, one of which is connected directly to the hydraulic brake force booster 2 and the other to the master cylinder 3, each provide braking pressure to a front wheel VL or VR and a rear wheel HR or HL, while a diagonal allocation of the brake circuits 9, 10 was chosen. Wheels VL and VR are on front axle 30, and wheels HR and HL are on rear axle 32.

Inlet valves 11, 12, 13 are inserted in the pressure medium paths towards the wheel brakes 14, 15, 16, 17. The wheel brakes 14 to 17 are also connected by way of outlet valves 18, 19, 20 with a return flow conduit 21, which in turn leads to the pressure compensation and supply reservoir 8.

Finally, a valve arrangement 22 with hydraulic connection conduits shown in dash-dotted lines and with a check valve 23 is provided, by way of which, to compensate for the medium flowing back by way of outlet valves 18, 19, 20 to reservoir 8, pressure medium can be supplied from the auxiliary energy source 5-7 directly, or, as shown here indirectly by way of the booster outlet. The valve arrangement 22 can be electrically or hydraulically actuatable.

The special feature of the two-circuit brake system illustrated in that in the one diagonal, i.e. the one connected to the brake circuit 10, the two wheel brakes 16, 17 can be supplied with braking pressure by means of the valve pair 13, 20 only concurrently. In the example shown, the left front wheel VL and the right rear wheel HR are connected to the brake circuit 10 with individual control.

As inlet and outlet valves, electromagnetically actuatable two-way/two-position directional control valves are used here, among which the inlet valves 11 to 13 are normally, i.e. in their initial position in which the magnets are not energized, switched to open passage, whereas the outlet valves 18 to 20 in their initial position present the flow-off of pressure medium.

As compared to a conventional brake system with two hydraulic brake circuits comprising one control channel each, the quasi three-channel system shown in the drawing has considerable advantages despite the minor additional expense which is limited to an additional valve pair with the associated electronic control system shown in FIG. 2. As illustrated in FIG. 2, the sensor inputs S connected to the electronic circuits ES are respectively further connected to each vehicle wheel. The outputs shown generally at 0 of electronic circuits ES are respectively connected to the electromagnetically actuatable control valves. of FIG. 1 Three wheels can be provided optimally at any time with the required braking pressure, while the fourth wheel, i.e. the wheel in the brake circuit 9 with joint control whose braking pressure depends on that of the wheel connected in parallel, in certain braking situations contributes to the braking operation to a degree slightly below optimum; this is true in any case if the braking pressure in the wheel brakes 16, 17 of the two wheels VR, HL connected in parallel is determined according to the select-low principle.

In case of a low coefficient of friction, i.e. on a slippery road, and in particular when the vehicle is relatively heavily loaded, it is advantageous that by a switching-over of the inlet valve 11 the braking pressure at the front wheel VL in the illustrated embodiment can be maintained constant and simultaneously the braking pressure in the wheel brake 15 of the associated rear wheel HR can be increased. The contribution of the rear wheel to the braking of the vehicle, which is important in this situation, can thus be fully utilized without jeopardizing the running stability of the associated front wheel VL and thus the steerability of the vehicle.

It should now be appreciated that the measures provided by the present invention as compared to brake systems with two hydraulic brake circuits and two control channels considerably improve the braking both at a high and at a low coefficient of friction.

It should be understood that the brake system described and shown herein is suitable for vehicles with either right-hand or left-hand drive. The system for a vehicle with left-hand drive would differ from the above description in that the right front (VR) and left rear (HL) wheels would be connected by way of the individually controllable inlet and outlet valves to the common pressure medium circuit 10 and to the pressure compensation reservoir 8, respectively.

What is claimed is:

1. Slip-controlled brake system for motor vehicles having right and left front wheels and right and left rear wheels, comprising a braking pressure generator fed from an auxilliary energy source, to which generator the wheel brakes of each front wheel and its associated diagonally opposite rear wheel form first and second diagonal pairs, which are connected by way of two hydraulically separated pressure medium circuits into which inlet valves are inserted which normally, in their initial position, are switched to open passage, and comprising return flow conduits into which outlet valves closed in their initial position are inserted, further comprising wheel sensors for determination of the rotational behavior of the wheels and electronic circuits for processing sensor signals and generating braking pressure control signals which can be transmitted to the inlet and outlet valves, wherein the wheel brakes of the two associated wheels in the first diagonal pair are connected by way of said inlet valves and outlet valves, which are individually actuatable, and, in the second diagonal pair, the wheel brakes of the two other associated wheels are commonly connected by way of another of said inlet valves and another of said outlet valves , which are concurrently actuatable, to the braking pressure generator and to the pressure compensation reservoir respectively, whereby said first diagonal pair of brakes and one of said second diagonal pair of brakes can be provided with the optimally required braking pressure, while the other brake of said second diagonal pair is provided with less than the optimally required braking pressure in certain braking situations.

2. A brake system according to claim 1, wherein said system is adapted for installation in vehicles with right-hand drive in that the left front wheel and the right rear wheel are connected by way of individually controllable inlet and outlet valves to one of said pressure medium circuits and to the pressure compensation reservoir respectively.

3. A brake system according to claim 1, wherein said system is adapted for installation in vehicles with left-hand drive in that the right front wheel and the left rear wheel are connected by way of individually controllable inlet and outlet valves to one of said pressure medium circuits and to the pressure compensation reservoir respectively.

4. A brake system according to claim 3, wherein the inlet valves and the outlet valves are provided as electromagnetically actuatable multidirectional control valves comprising two-way/two-position directional control valves.

5. A brake system according to claim 3, wherein the inlet valves and the outlet valves are provided as electromagnetically actuatable multi-directional control valves.

6. A brake system according to claim 1, wherein each of said pressure medium circuits supply braking pressure to a pair of diagonally opposite wheels, and wherein one of said pressure medium circuits supply braking pressure to a pair of wheels through said individually actuatable valves, while said other pressure medium circuit supplies braking pressure to the other pair of wheels through said concurrently actuatable valves.

* * * * *